US009917376B2

(12) United States Patent
Belmkaddem et al.

(10) Patent No.: US 9,917,376 B2
(45) Date of Patent: Mar. 13, 2018

(54) METHOD FOR DETERMINING AN ANTENNA ARRAY

(71) Applicant: Commissariat à l'énergie atomique et aux énergies alternatives, Paris (FR)

(72) Inventors: Kawtar Belmkaddem, Grenoble (FR); Lionel Rudant, Grenoble (FR)

(73) Assignee: Commissariat à l'énergie atomique et aux énergies alternatives, Paris (FR)

( * ) Notice: Subject to any disclaimer, the term of this patent is extended or adjusted under 35 U.S.C. 154(b) by 769 days.

(21) Appl. No.: 14/463,979

(22) Filed: Aug. 20, 2014

(65) Prior Publication Data

US 2015/0054688 A1 Feb. 26, 2015

(30) Foreign Application Priority Data

Aug. 20, 2013 (FR) ..................................... 13 58089

(51) Int. Cl.

*G01S 1/00* (2006.01)
*H01Q 23/00* (2006.01)
*H01Q 19/30* (2006.01)
*H01Q 5/385* (2015.01)

(52) U.S. Cl.

CPC ............. *H01Q 23/00* (2013.01); *H01Q 5/385* (2015.01); *H01Q 19/30* (2013.01)

(58) Field of Classification Search

CPC ........... G01S 1/00; H01C 23/00; H01C 5/385; H01C 19/30
USPC ................................................. 342/285, 385
See application file for complete search history.

(56) References Cited

U.S. PATENT DOCUMENTS 6,469,677 B1 * 10/2002 Schaffner ................. H01Q 9/14 343/700 MS
7,418,343 B1 * 8/2008 McGraw ................... G01S 3/36 244/76 R
7,898,493 B1 3/2011 Rojas et al.
2004/0227668 A1 * 11/2004 Sievenpiper ........... H01Q 13/20 343/700 MS
2006/0232492 A1 10/2006 Sawatani
(Continued)

FOREIGN PATENT DOCUMENTS

FR 2958086 A1 * 9/2011 ............. H01Q 3/247

OTHER PUBLICATIONS

Warren L. Stutzman and Gary A Thiele, "Antenna Theory and Design", Jan. 1, 1998, John Wiley & Sons, USA, XP002727044, p. 25-40.

*Primary Examiner* — Harry K Liu
(74) *Attorney, Agent, or Firm* — Knobbe, Martens, Olson & Bear, LLP

(57) ABSTRACT

A method for generating an electromagnetic wave with an antenna array, the antenna array including at least one antenna, at least one circuit having parameters having an influence on the electromagnetic wave generated by the antenna array and connected to at least one antenna, and the method comprising: selecting a criterion to be met for the wave generated by the antenna array; determining desired decomposition coefficients of a wave in a basis giving the possibility of attaining the selected criterion; and calculating the parameters having an influence on the electromagnetic wave generated by the antenna array for each circuit of the antenna array so that the difference between the decomposition coefficients on the basis of the wave generated by the antenna array and the desired decomposition coefficients be minimal.

14 Claims, 2 Drawing Sheets

(56) References Cited

U.S. PATENT DOCUMENTS

| | | | | |
|---|---|---|---|---|
| 2007/0182634 | A1* | 8/2007 | Yamamoto | H01Q 3/242<br>343/700 MS |
| 2009/0143038 | A1* | 6/2009 | Saito | H01Q 1/007<br>455/272 |
| 2010/0164802 | A1* | 7/2010 | Li | H01Q 1/246<br>342/372 |
| 2010/0214185 | A1* | 8/2010 | Sammoura | C25D 5/44<br>343/776 |
| 2011/0309994 | A1 | 12/2011 | Kato et al. | |
| 2013/0202015 | A1* | 8/2013 | Frank | H04B 7/0632<br>375/219 |

* cited by examiner

METHOD FOR DETERMINING AN ANTENNA ARRAY

FIELD OF THE INVENTION

The present invention relates to a method for determining an antenna array. The present invention also relates to an antenna array.

BACKGROUND OF THE INVENTION

The invention applies to the field of antenna arrays. For many applications, directive radiation is desired. As an illustration, detection and communication with a target require radiation to be focused in a preferential direction. Avoiding electromagnetic pollution outside useful areas is another example of an application involving relatively directive radiation.

In order to increase the directivity of an antenna array, the use of reflectors such as parabolic antennas, the arraying of antennas and the association of coupled antennas like for antennas of the Yagi-Uda type are known from the state of the art.

However, these solutions strongly increase the size of the antenna array. Indeed, the directivity of a reflective antenna is estimated conventionally by the formula $$D = \frac{4\pi}{\lambda^2} A$$

wherein A is the visible projected surface along the main radiation direction. Notably, this means that for a reflecting disc of radius R, $$D = \frac{4\pi^2 R^2}{\lambda^2}.$$

It is also known how to jointly energize a radiation mode of the transverse electric (TE) type and a magnetic mode (TM) within a same antenna array. An antenna array structure supporting such an operation is called a Huygens source. For example, in document FR-A-2 949 611, a structure is proposed, based on a resonator consisting of a ring-shaped conducting helix producing a Huygens source with a reduced antenna size.

However, the maximum directivity level which may be attained with this type of antenna array structure is limited by the directivity of the ideal Huygens source, which is of 4.7 dBi. The unit dBi means "decibel relative to an isotropic source". Generally, the directivity of an antenna is normally expressed in dBi, by taking as a reference an isotropic antenna, i.e. a fictitious antenna of the same total radiated power which uniformly radiates in all the directions with radiation of 0 dBi.

SUMMARY OF THE INVENTION

Therefore there exists a need for a method for determining an antenna array with which it is possible to obtain an antenna array having improved directivity with reduced compactness.

According to the invention, this object is achieved with a method for determining an antenna array able to generate an electromagnetic wave, comprising at least one antenna and at least one circuit having parameters which have an influence on the electromagnetic wave generated by the antenna array and connected to at least one antenna. The method comprises steps for selecting a criterion to be met for the wave generated by the antenna array and for determining desired decomposition coefficients of a wave in a basis with which the selected criterion may be attained. The method also comprises a step for calculating parameters having an influence on the electromagnetic wave generated by the antenna array for each circuit of the antenna array so that the difference between the decomposition coefficients on the basis of the wave generated by the antenna array and the desired decomposition coefficients be minimal.

According to particular embodiments, the method comprises one or several of the following features, taken individually or according to all the technically possible combinations:

- the circuit is a coupling circuit and/or the circuit is at least one load.
- the calculating step comprises a sub-step for calculating an excitation vector of the antenna array from the desired decomposition coefficients, and for determining parameters having an influence on the electromagnetic wave generated by the antenna array for each circuit of the antenna array from the calculated excitation vector.
- the decomposition and calculating steps are carried out with matrix computation.
- the basis is the basis of spherical modes.
- the criterion is selected from a group consisting of the following elements: the directivity of the antenna array in a given direction, the ratio of the front/rear return of the antenna array, the radiation diagram of the array is substantially identical with a radiation diagram obtained with a specific mask, and the radiation diagram of the array in a perturbed environment is identical with a desired radiation diagram.
- the circuit is a coupling circuit based on waveguides, the parameters having an influence on the electromagnetic wave generated by the antenna array being parameters characterizing the impedance of the waveguide, the length of the guide and the impedance of a load associated with the coupling circuit.
- at least one load comprises two separate components, a first component being a resistor and the second component being selected from an inductor or a capacitor.
- at least one load has a negative resistance.

BRIEF DESCRIPTION OF THE DRAWINGS

Other features and advantages of the invention will become apparent upon reading the description which follows of embodiments of the invention, only given as an example and with reference to the drawings wherein.

DETAILED DESCRIPTION OF THE PREFERRED EMBODIMENTS

Figure 1:
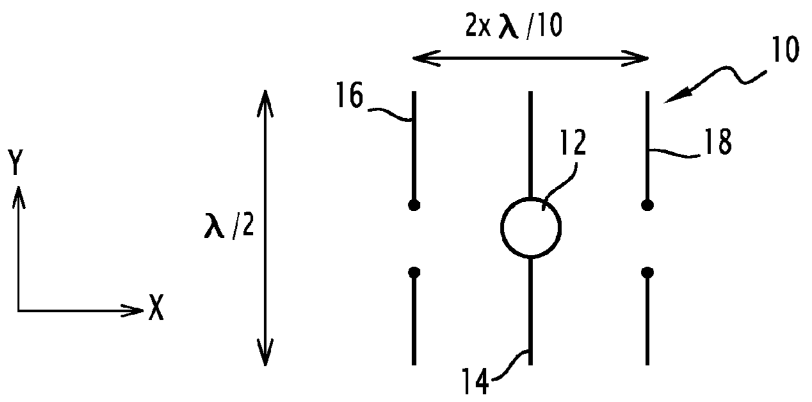
FIG. 1 is a generic schematic illustration of an antenna array according to an embodiment.
Figure 2:
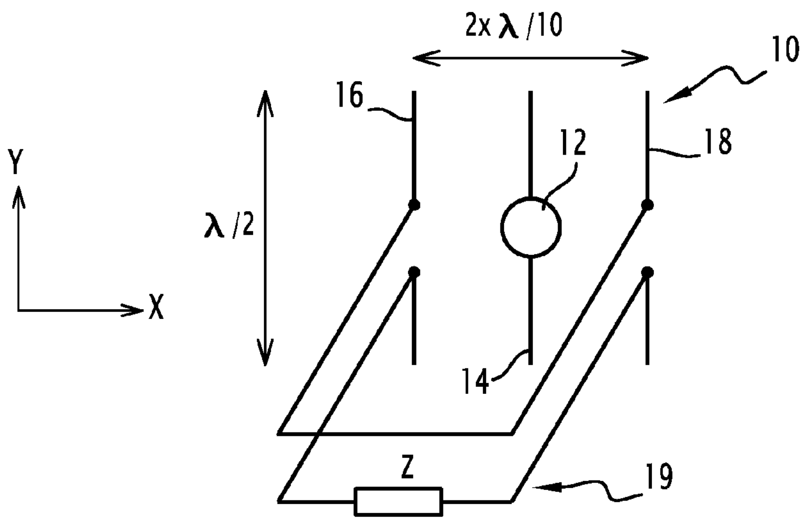
FIG. 2 is a schematic illustration of an antenna array according to a first embodiment.
Figure 3:
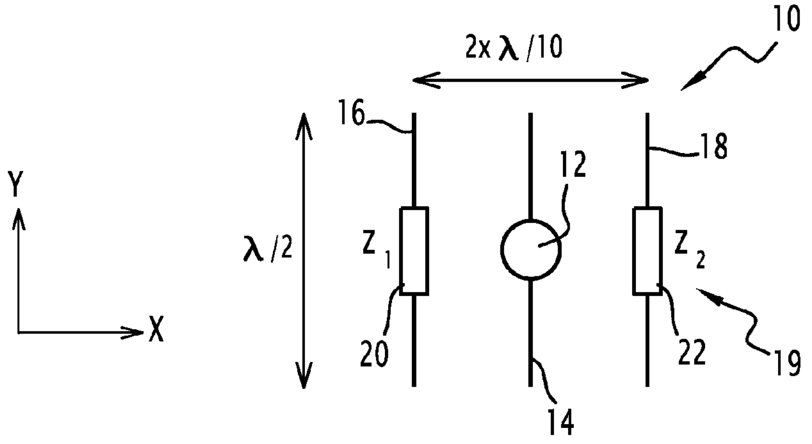
FIG. 3 is a schematic illustration of an antenna array according to a second embodiment.

An antenna array 10 is proposed, as illustrated in a generic way in FIG. 1 and by both embodiments of FIGS. 2 and 3.

An antenna array generally comprises of at least one primary antenna and one secondary antenna. Each of these antennas being part of the antenna array comprises one or several radiating portions. The radiating portions of each separate antenna are physically separate. By the expression "physically separate", it is meant that there is no physical contact between two radiating portions belonging to two separate antennas.

For what follows, two axes X and Y contained in FIGS. 1 to 3 are defined. The axis X is perpendicular to the axis Y. A direction parallel to the X axis is called a longitudinal direction and a direction parallel to the axis Y is called a transverse direction.

The antenna array 10 includes a source 12, a first antenna 14, a second antenna 16, a third antenna 18 and a circuit 19 (not shown in FIG. 1).

The first antenna 14 is an antenna associated with the source 12. The source 12 delivering a useful signal for the relevant application for the array 10, the first antenna 14 is considered as a primary antenna. Thus, the first antenna 14 is said to be a primary antenna in the following.

The second antenna 16 is an antenna associated with a passive or active load. The second antenna 16 is not directly associated with a source delivering a useful signal. The second antenna 16 in this sense is a secondary antenna while the first antenna 14 is a primary antenna. The same remark applies for the third antenna 18. Thus, the second antenna 16 and the third antenna 18 are said to be secondary antennas in the following of the description.

The number of antennas of the antenna array 10 is given as an example; any type of antenna array 10 comprising at least one antenna may be connected to a circuit 19 which may be considered.

In particular, the antenna array 10 comprises several primary antennas in certain embodiments.

Alternatively, the antenna array 10 comprises a large number, for example about ten or about a hundred secondary antennas.

The antenna array 10 is able to generate an electromagnetic wave noted as Ototal. The antenna array 10 is thus able to operate for at least one wavelength noted as λ in the following description. The wavelength λ is comprised between a few hundredths of a millimeter and a few tens of meters. In terms of frequencies, this corresponds to frequencies comprised between the high frequency band (often designated by the acronym HF) and frequencies of the order of a few TeraHertz.

Depending on the relevant application (cell phones, home automation . . . ), the antenna array 10 is able to operate on more restricted frequency ranges.

Advantageously, the antenna array 10 is able to operate for a frequency range comprised between 30 MHz and 90 GHz. This makes the relevant antenna array 10 particularly suitable for radio communications.

The circuit 19 is a circuit having parameters which influence the electromagnetic wave generated by the antenna array 10.

The circuit 19 is either a coupling circuit based on waveguides, associated with a load Z as illustrated in FIG. 2, or at least one load as shown in FIG. 3, or a hybrid circuit between the coupling circuit of FIG. 2 and the load shown in FIG. 3.

In FIG. 2, the circuit 19 is a waveguide connecting the second antenna 16 to the third antenna 18 via a load Z (which may not be present). This simple layout may be made as complex as desired depending on the contemplated embodiments.

In the case of the circuit 19 of FIG. 2, the parameters having an influence on the electromagnetic wave Ototal generated by the antenna array 10 are the parameters characterizing the form of the coupling circuit. For example, the impedance of the load Z, the impedance specific to the waveguide used, the length of the waveguide are examples of parameters characterizing the coupling circuit. In the case of FIG. 3, the circuit 19 includes two loads 20, 21, the first load 20 being connected to the second antenna 16 and the second load 21 being connected to a third antenna 18.

In this example, the parameters having an influence on the electromagnetic wave Ototal generated by the antenna array 10 have the value of the impedance of each of both loads 20, 22.

Preferably, at least one load from among the first load 20 and the second load 22 comprises two separate components, a first component being a resistor and the other component being selected from among an inductor or a capacitor.

By "separate component", it is meant that each component has negligible parasitic impedances relatively to its main impedance. Thus, a resistor has a much greater resistance value than the parasitic resistance of an inductor or a capacitor. Also, a capacitor has a much greater capacitance value than the parasitic capacitance of an inductor or of a resistor and an inductor has a much greater inductance value than the parasitic inductance of a resistor or a capacitor.

In the case of FIG. 3, as an example, the two loads 20 and 22 are the ones which include two separate components.

Preferably, the impedance of each load 20, 22 has:

a real part strictly less than 0, or a non-zero imaginary part and a non-zero real part.

According to another embodiment, at least one load 20, 22 has adjustable impedance. This makes the antenna array 10 more flexible.

Alternatively, at least one load 22, 22 is an active component.

It is proposed to determine the antenna array 10, illustrated in FIG. 2 or in FIG. 3 by means of a method for determining.

The method for determining includes a step for selecting a criterion to be met for the wave Ototal generated by the antenna array 10.

Generally, the criterion is either a performance criterion or a criterion of compliance with a mask.

The directivity of the antenna array 10 in a given direction and the ratio of the front/rear return of the antenna array 10 are two examples of a performance criterion.

Whether the radiation diagram of the array 10 is substantially identical with a radiation diagram obtained according to a specific mask, or whether the radiation diagram of the array 10 in a perturbed environment is identical with a desired radiation diagram, are two examples of a criterion for compliance with a mask.

The method is based on a following step for decomposing a wave in a basis. The method also includes a step for determining the desired decomposition coefficients, for example by breaking down a wave meeting the selected criterion. Preferably, the basis used in the decomposition step is the basis of spherical modes. This basis allows simplification of the calculations to be performed while retaining good accuracy. Indeed, selecting this basis does not imply the use of an approximation.

Advantageously, the decomposition step is carried out by means of a matrix calculation for reducing the time for applying this step.

The method then comprises a step for calculating the parameters having an influence on the electromagnetic wave Ototal generated by the antenna array 10, for example the parameters of each circuit 20, 22 of the antenna array 10 so that the difference between the decomposition coefficients on the basis of the wave generated by the antenna array 10 and the desired decomposition coefficients is a minimum.

Applied to the case of FIG. 2, this calculation step gives the possibility of obtaining the parameters characterizing the form of the coupling circuit forming the circuit 19.

Applied to the case of FIG. 3, this calculation step gives the possibility of obtaining the value of the impedances Z1 and Z2 of both loads 20, 22.

Advantageously, the calculation step is carried out by means of a matrix calculation, which simplifies the application of this step.

Preferably, the calculation step includes a sub-step for calculating an excitation vector Λ of the antenna array 10 giving the possibility of obtaining the desired decomposition coefficients and a sub-step for determining the parameters having an influence on the electro-magnetic wave Ototal generated by the antenna array 10 of each load 20, 22 of the antenna array 10 from the calculated excitation vector Λ.

The method thus allows optimization of the antenna array 10 so that the antenna array 10 meets an intended criterion. This optimization is an optimization giving the possibility of finding the best value if it exists and this in an exact way, without having to carry out iterative optimization.

Thus, an antenna array 10 is obtained, having improved properties.

The thereby determined antenna array 10, finds its application in many systems. As an example, mention may be made of a vehicle, a terminal, a mobile telephone, a point for accessing a wireless array, a base station, a radiofrequency excitation probe . . . .

In the following, the antenna array 10 of FIG. 3 as well as the method for determining applied to the antenna array 10 of FIG. 3 are detailed, it being understood that the extension of the application of the method for determining to the antenna array 10 described in FIG. 2 is accessible to one skilled in the art by means of the teachings hereafter.

FIG. 3 illustrates a schematic illustration of an antenna array 10, including a source 12, a first antenna 14, a second antenna 16, a third antenna 18, a circuit 19 comprising a first load 20 and a second load 22.

The source 12 is for example a generator of radiofrequency waves. The source 12 is able to provide radiofrequency waves for energizing the primary antenna 14 at the wavelength λ. The source 12 is connected to the first antenna 14. The source 12 may have an internal impedance of 50 Ohms.

According to the example of FIG. 3, the first antenna 14 appears as a conductive wire extending along a longitudinal direction. Along this longitudinal direction, the first antenna 14 has a dimension equal to λ/2.

According to the example of FIG. 3, the second antenna 16 also appears a conducting wire extending along a longitudinal direction. Along this longitudinal direction, the second antenna 16 has a dimension equal to λ/2. The second antenna 16 is positioned parallel to the first antenna 14 at a distance of λ/10 relatively to the first antenna 14 along a transverse direction.

According to the example of FIG. 3, the third antenna 18 also appears as a conducting wire extending along a longitudinal direction. Along this longitudinal direction, the third antenna 18 has a dimension equal to λ/2. The third antenna 18 is positioned parallel to the first antenna 14 at a distance of λ/10 relatively to the first antenna 14 along a transverse direction. The third antenna 18 is also positioned parallel to the second antenna 16 at a distance of λ/5 relatively to the second antenna 16 along the transverse direction. Worded otherwise, the first antenna 14 is positioned in the middle of the second antenna 16 and the third antenna 18. This layout is only described as an example, it being understood that any other layout may be contemplated.

The first load 20 is connected to the second antenna 16.

The first load 20 comprises at least two separate components. For example, the first load 20 is the association of a capacitor and of a resistor. Alternatively, the first load 20 is the association of an inductor and of a resistor. The impedance of the first load 20 is noted as Z1.

Advantageously, the impedance Z1 of the first load 20 has a real part strictly less than zero, or a non-zero imaginary part and a non-zero real part. Indeed, by applying these types of load it is possible to obtain a decomposition of the wave closer to the sought coefficients, as compared with conventional solutions which exclude the use of resistors associated with reactances for limiting the losses in the antenna array 10.

This means that the first load 20 is not a pure resistance or a pure reactance.

Thus, according to an embodiment, the impedance Z1 of the first load 20 is equivalent to the series association of a resistor and of a coil, the inductance of the coil being greater than 1 nH.

According to another embodiment, the impedance Z1 of the first load 20 is equivalent to the series association of a resistor and of a capacitor, the capacitance of the capacitor being greater than 0.1 pF. Still according to another embodiment, the impedance Z1 of the first load 20 is equivalent to the series association of a resistor and of a capacitor or a coil, the resistance being greater than 0.1 Ohms.

According to an embodiment, the impedance Z1 has a negative real part. Producing a negative resistance is accomplished in a way known in the state of the art by introducing an active device, for example an operational amplifier in order to produce a negative resistance.

According to another alternative, the impedance Z1 has a negative imaginary part. Producing a negative capacitance or inductance is accomplished by means of a circuit of the negative impedance converter (NIC) type.

Thus, according to both of these alternatives which may be combined, the first load 20 comprises one or several active components.

Another advantage of active components is that it allows components to be made easily, having the opposite impedance which would be difficult to produce in practice. Typically, a large inductor with low bulkiness is difficult to obtain by means of an inductor but may be obtained with a circuit producing a negative capacitance. Also, a small capacitance is more easily obtained by using a circuit producing a negative inductance.

Preferentially, the impedance Z1 corresponds to the impedance of a mixed load which is both resistive and reactive. In other words, the impedance Z1 has a non-zero real part and a non-zero imaginary part.

The second load 22 is connected to the third antenna 18.

The second load 22 has an impedance Z2. The same remarks as made earlier for the impedance Z1 of the first load 20 apply for the impedance Z2 of the second load 22.

The operation of the antenna array 10 is now described.

During operation, the source 12 emits a radiofrequency wave capable of energizing the first antenna 14.

The first antenna 14 then emits a first radiofrequency wave O1 under the effect of the energization due to the source 12. This radiofrequency wave O1 corresponds to a first electric field noted as E1.

The electric field E1 then energizes the secondary antennas 16 and 18.

As a response, the second antenna 16 emits a second radiofrequency wave O2 under the effect of the energization due to the electric field E1. This second radiofrequency wave O2 corresponds to a second electric field noted as E2. The second electric field E2 notably depends on the value of the impedance Z1 of the first load 20.

Similarly, as a response, the third antenna 16 emits a third radiofrequency wave O3 under the effect of the excitation due to the electric field E1. This further radiofrequency wave O3 corresponds to a third electric field noted as E3. The third electric field E3 notably depends on the value of the impedance Z3 of the second load 22.

Thus, when the source 12 emits a radiofrequency wave, the antenna array 10 emits a radiofrequency wave Ototal which corresponds to the superposition of the first wave generated by the first antenna 14 and of the second and third waves generated by the second and third antennas 16 and 18. In terms of electric field, by noting as Etotal the electric field of the antenna array 10 associated with the radiofrequency wave Ototal, such a superposition implies that the electric field of the antenna array 10 is the sum of the three electric fields of the three antennas 14, 16, 18 of the array. This is written mathematically according to the following relationship:

$$E\text{total}(Z1,Z2)=E1+E2(Z1)+E3(Z2)$$

In the previous relationship, it was shown that the electric field of the antenna array 10 depends on the value of the impedances Z1 and Z2 of the first and second loads 20, 22 via the second field E2 and the third field E3.

This dependency gives a possibility to the antenna array 10 of adjusting the electric field generated by the antenna array 10, independent of the specific structure of the antenna array 10 (numbers of antennas 14, 16, 18, shape of the antennas 14, 16, 18 and relative positions of the antennas 14, 16, 18). This is particularly advantageous insofar that the modification of the structure of the antenna array 10 causes modifications of the electric field produced by the antenna array 10 which are often difficult to predict.

By modifying the values of the impedances Z1 and Z2 of the loads 20 and 22, it is possible to modify the radiation diagram obtained for the antenna array 10. In particular, according to a preferred embodiment, the radiation diagram is made directive in a preferential direction by imposing the values of impedances Z1 and Z2. Indeed, the antenna array 10 has a dimension of λ/2 along a longitudinal direction and a dimension of λ/5 along a transverse direction.

The property of the antenna array 10 according to which the total radiation produced may be controlled by selecting the impedances Z1, Z2 of the loads 20, 22 may notably be utilized within the scope of a method for determining the antenna array 10 so that the total radiofrequency wave Ototal generated by the antenna array 10 meets a desired criterion. An example of application of such a method is described in the following.

For better understanding, the method is first shown in a general case of any antenna array 10 comprising any number of antennas and then applied to the particular case of the antenna array 10 shown in FIG. 3.

The method for determining first comprises a step for selecting a criterion to be met for the total radiofrequency wave Ototal generated by the antenna array 10.

As an example, for the following of the description, it is assumed that the selected criterion is better directivity of the antenna array 10 in a direction with an elevational angle $\theta_0$ and an azimuthal angle $\phi_0$. Other criteria may be contemplated like optimization towards a performance criterion of the antenna like reduction of a cross-polarization level (i.e. perpendicular to the main polarization of the relevant wave) in a given direction or further maximization of a front-rear ratio etc. The criterion may also be the compliance with a given type of radiation, for example radiation of the dipolar type or any other radiation specified by a radiation mask.

The method is also based on a decomposition of a wave in a basis. The method also includes a step for determining the decomposition coefficients with which it is possible to attain the selected criterion, for example by decomposing a wave meeting the selected criterion.

According to the illustrated example, the selected basis is the basis of spherical modes because this basis allows simplification of the calculations to be carried out while retaining good accuracy. Indeed, selecting this basis does not imply that an approximation is made.

Alternatively, any other basis may be considered. Notably the basis of plane waves may be used for decomposing the relevant wave.

The basis of spherical modes is defined from the following observation: in an isotropic, homogeneous and sourceless medium, an electric field is expressed in a spherical basis localized through the coordinates r, θ and ϕ in the form:

$$\vec{E}(r,\theta,\varphi)=\sqrt{\eta}\,\frac{1}{\sqrt{4\pi}}\,\frac{e^{jkr}}{r}\sum_{s=1}^{2}\sum_{n=1}^{\infty}\sum_{m=-n}^{n}Q_{smn}^{(3)}\vec{K}_{smn}(\theta,\varphi)$$

Wherein:

η is the impedance of the vacuum (propagation medium), j is the complex number, k is the norm of the wave vector associated with the electric field E, $Q_{smn}$ is the decomposition coefficient of the electric field on the s, m, n mode of the basis of spherical modes, and $\vec{K}_{1\ mn}(\theta,\phi)$ and $\vec{K}_{2\ mn}(\theta,\phi)$ are the different spherical modes.

The general mathematical expression of spherical modes is also known as shown by the following equations 3 and 4.

$$\vec{K}_{1mn}(\theta,\varphi)=\sqrt{\frac{2}{n(n+1)}}\left(-\frac{m}{|m|}\right)^{m}e^{jm\varphi}(-j)^{n+1}\left\{\frac{jm\overline{P}_n^{|m|}(\cos\theta)}{\sin\theta}\vec{e}_\theta-\frac{d\overline{P}_n^{|m|}(\cos\theta)}{d\theta}\vec{e}_\varphi\right\}$$

$$\vec{K}_{2mn}(\theta,\varphi)=\sqrt{\frac{2}{n(n+1)}}\left(-\frac{m}{|m|}\right)^{m}e^{jm\varphi}(-j)^{n}\left\{\frac{d\overline{P}_n^{|m|}(\cos\theta)}{d\theta}\vec{e}_\theta-\frac{jm\overline{P}_n^{|m|}(\cos\theta)}{\sin\theta}\vec{e}_\varphi\right\}$$

Wherein:

$\vec{e}_\theta$ is the unit vector associated with θ, $\vec{e}_\phi$ is the unit vector associated with the coordinate ϕ, $$\overline{P}_n^m(\cos\theta) = \sqrt{\frac{2n+1}{2}\frac{(n-m)!}{(n+m)!}}(\sin\theta)^m \frac{d^m}{d(\cos\theta)^m}\left[\frac{1}{2^n n!}\frac{d^n}{d(\cos\theta)^n}(\cos^2\theta-1)^n\right],$$

and $$\frac{d\overline{P}_n^{|m|}(\cos\theta)}{d\theta} = \begin{cases} -P_n^1(\cos\theta)\sqrt{\frac{2n+1}{2}} & m=0 \\ \frac{1}{2}((n-|m|+1)(n+|m|)P_n^{|m|-1}(\cos\theta) - P_n^{|m|+1}(\cos\theta))\sqrt{\frac{2n+1}{2}\frac{(n-|m|)!}{(n+|m|)!}} & |m|>0 \end{cases}$$

From a matrix point of view, the existence of the basis of spherical modes expresses that in an isotropic, homogeneous and source-less medium, an electric field is expressed as:

$$E=K\times Q$$

Wherein:

The θ and ϕ dependency is not taken again in order to reduce the notations,

E is a vector describing the electric field radiated in the different directions of space and for the different components of the polarization for example written as:

$$E = \begin{pmatrix} E_\theta(\theta_1, \phi_1) \\ E_\phi(\theta_1, \phi_1) \\ E_\theta(\theta_2, \phi_2) \\ E_\phi(\theta_2, \phi_2) \\ \dots \end{pmatrix}$$

K is a matrix describing the radiation diagram of the spherical modes for example written as:

$$K = \begin{bmatrix} K_{11-1} & K_{110} & K_{111} & \dots \\ K_{12-2} & K_{12-1} & K_{120} & \dots \\ \dots & \dots & \dots & \dots \\ K_{21-1} & K_{210} & K_{211} & \dots \\ K_{22-2} & K_{22-1} & K_{220} & \dots \\ K_{23-3} & K_{23-2} & K_{23-1} & \dots \\ \dots & \dots & \dots & \dots \end{bmatrix}$$

Other organizations of the matrix K may be considered in this step, the previous organization is only given as an example. Further, in practice, as an indication, it may be noted that the matrix K is without any zero elements.

"x" designates matrix multiplication, and

Q is the matrix grouping the different coefficients $Q_{smn}$ for the decomposition of the electric field written as, for example:

$$Q = \begin{pmatrix} Q_{1-11} \\ Q_{2-11} \\ Q_{101} \\ Q_{201} \\ \dots \end{pmatrix}$$

By using matrix formalism, it is possible to simplify the calculations of the method for determining.

When this matrix formalism is applied to a particular case for obtaining greater directivity of the antenna array 10 in a direction determined by the elevation angle $\theta_0$ and the azimuthal angle $\phi_0$, it is possible to show that a wave meeting such a criterion is a wave for which the matrix grouping the different decomposition coefficients $Q_{smn}$, of the electric field verifies the following relationship:

$$Q=Q_{OPT}=a.K^*(\theta_0,\phi_0)$$

Wherein:

a is a normalization constant,

"." designates scalar multiplication, and

"*" designates the mathematical complex conjugation operation.

This last relationship therefore gives the possibility of obtaining the desired decomposition coefficients.

The method for determining next includes a step for calculating values of the impedances Z1, Z2 of each load 20, 22 of the antenna array 10, so that the difference between the decomposition coefficients on the basis of the wave generated by the antenna array 10 and the desired decomposition coefficients is minimized.

The calculation step includes a sub-step for expressing the wave generated by the antenna array 10 on the basis of spherical modes.

According to a preferred embodiment, this expression sub-step is applied by decomposing the electric field associated with the wave generated by the antenna array 10 into an elementary electric field produced by each antenna belonging to the antenna array 10.

Thus, as explained earlier, for the specific case of the antenna array 10 of FIG. 3 the electric field E1 related to the first antenna 14, the electric field E2 generated by the second antenna 16 and the electric field E3 generated by the third antenna 18 are related to the total electric field Etotal produced by the antenna array 10 according to the relationship:

$$E\text{total}=E1+E2+E3$$

This decomposition into elementary electric fields gives the possibility of facilitating the calculations carried out in the continuation of the application of the method. Indeed, this decomposition only takes into account the specific structure of each antenna and not the possible loads to which this antenna may be connected.

The expression sub-step then includes the expression of each elementary electric field in the basis of the spherical modes, which is mathematically expressed by:

$$Ei=K\times Qi$$

Wherein:

The θ and ϕ dependency is not taken again for reducing the notations.

Ei is the electric field generated by the $i^{th}$ antenna, and

Qi is the matrix grouping the different decomposition coefficients $Q_{smn}$ of the electric field generated by the $i^{th}$ antenna.

The expression sub-step then comprises a step for concatenating the different matrices Qi grouping the different decomposition coefficients $Q_{smn}$ of the electric field generated by the $i^{th}$ antenna in order to obtain a matrix Qtot corresponding to the expression of the wave generated by the antenna array 10 on the basis of the spherical modes.

The calculation step comprises a sub-step for calculating the excitation vector with which it is possible to obtain the desired decomposition coefficients illustrated by the matrix $Q_{OPT}$. This amounts to solving the following equation:

$$Q\text{tot}\times\Lambda=Q_{OPT}$$

Wherein:

Λ is the excitation vector of the antenna array 10, and

Qtot is the association within a single matrix of the Qi's.

At the end of the sub-step for calculating the excitation vector Λ, an excitation vector is obtained, which only depends on the structure of the antenna array 10 and on the criterion selected for the wave Ototal generated by the antenna array 10.

The calculation step then comprises a sub-step for determining values of the impedances Z1, Z2 of each load 20, 22 of the antenna array 10 from the calculated excitation vector Λ.

For this, according to an embodiment, the following equation is solved:

$$\Lambda=M\times\Lambda+P\times U$$

Wherein:

M is the matrix describing the couplings as well as the reflections associated with each of the loads of the antenna array 10 i.e., in the particular case of FIG. 3 with the first and second loads 20, 22, P is a matrix representing the connections between the antenna array 10 and external signals, and U is a vector describing the weighting of the external signals.

Applied to the antenna array 10 of FIG. 3, by solving the previous matrix equation, it is possible to find the following solutions:

$$Z1=7.6\Omega+i\times 9.95\Omega \text{ and}$$

$$Z2=0.1\Omega+i\times 13.54\ \Omega$$

For such values of the impedances of both loads 20, 22 of the array 10, good directivity in the direction with an elevational angle $\theta_0$ and an azimuthal angle $\phi_0$ is obtained.

Figure 4:
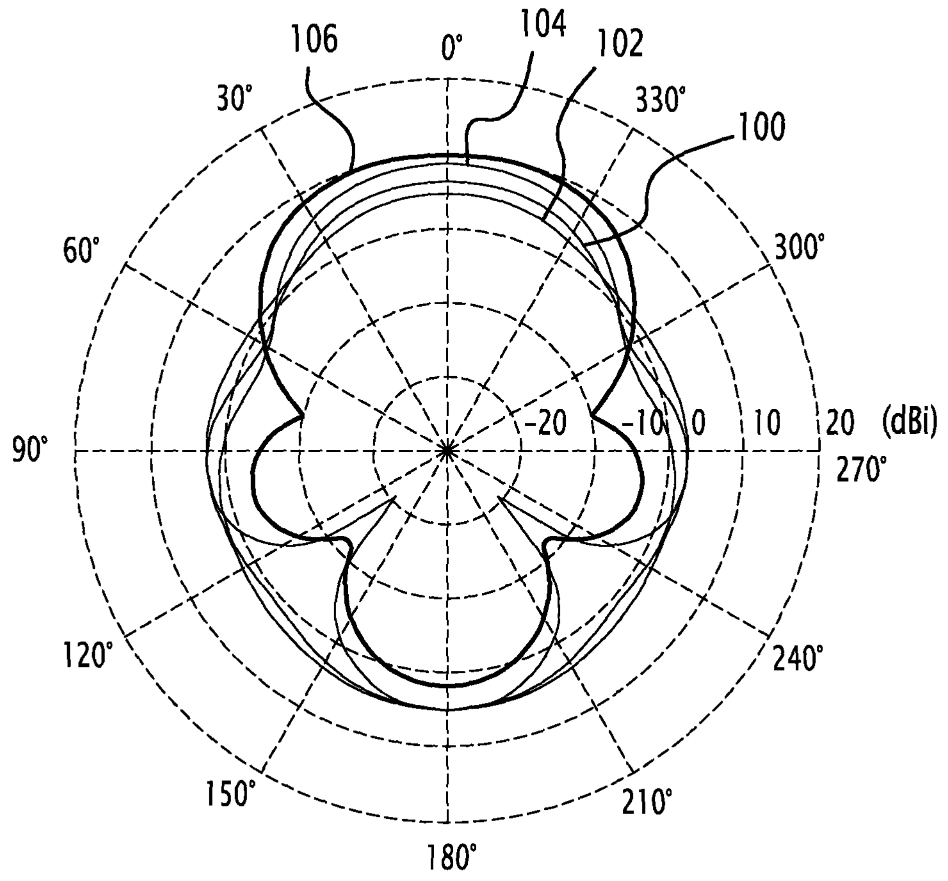
FIG. 4 is a radiation diagram for an antenna array obtained with the method according to the invention.

This notably appears in the study of FIG. 4. In FIG. 4, four radiation diagrams are illustrated. Each radiation diagram shows the angular distribution of the radiated power versus the azimuthal angle $\phi_0$ at a constant elevational angle (in this case $\theta_0=90°$).

The diagram illustrated by a curve 100 corresponds to the diagram obtained for the array 10 in the presence of a resistive load instead of each of the first and second loads 20, 22; the diagram illustrated by a curve 102 corresponds to the diagram obtained for the array 10 in the presence of a short circuit instead of each of the first and second loads 20, 22; the diagram illustrated by a curve 104 corresponds to the diagram obtained for the array 10 in the presence of a reactive load instead of each of the first and second loads, 20, 22 and the diagram illustrated by a curve 106 in black plotted as a bold curve corresponds to the diagram obtained for the array 10 in the presence of the first and second loads 20, 22 having the values determined earlier.

It therefore appears that for the direction with an elevation angle $\theta_0=90°$ and with an azimuthal angle $\phi_0=0°$, the directivity of the array 10 according to the invention is 10 dBi (dBi for isotropic decibel). Generally, the directivity of an antenna is normally expressed in dBi, by taking as a reference an isotropic antenna, i.e. a fictitious antenna which radiates uniformly in all directions. The directivity of this fictitious antenna is therefore equal to 1, i.e. 0 dBi. The directivity of the array 10 according to the invention is therefore greater than the directivities of the other curves.

The gain in directivity is also observed by examining the shapes of the curves 100, 102, 104 and 106. Indeed, for the antenna array of FIG. 3, a reduction of the radiation is observed outside the main direction.

Consequently, the array 10 of FIG. 3 has improved directivity in the direction with an elevation angle $\theta_0=90°$ and with an azimuthal angle $\phi_0=0°$.

Alternatively, instead of considering the directivity as a criterion, other criteria intended for the antenna array 10 are considered.

As an example, the criterion corresponds to imposing that the front/back ratio of the array 10 is greater than a desired value, that the radiation diagram of the array 10 is identical with a radiation diagram obtained with a specific mask or that the radiation diagram of the array 10 in a perturbed environment is identical with the desired radiation diagram.

In each of the proposed cases, one way for taking into account the criterion is to impose a specific matrix for the matrix grouping the different coefficients $Q_{smn}$ of the decomposition of the electric field to the wave decomposition step meeting the selected criterion in a basis for obtaining desired decomposition coefficients.

For example, this is the case when the criterion corresponds to imposing that he radiation diagram of the array 10 in a perturbed environment is identical with a desired radiation diagram. As an example of application, the antenna array 10 is intended to be attached on an upper portion of a vehicle, with an elongated shape. The elongated shape perturbs the radiation of the antenna array 10. By producing optimization of the antenna according to the method, object of the invention, it is possible to obtain an intended wave form generated by the whole of the vehicle.

The method for determining described earlier is applied to any type of antenna array 10 comprising at least one antenna which may be connected to a load. In particular, the antenna array 10 comprises in certain embodiments, several primary antennas.

Alternatively, the method for determining also comprises modifications of the characteristics of the structure of the antenna array 10 so as to promote observance of the selected criterion. For example, it is possible to modify the distance between the first antenna 14 and the second antenna 16. Alternatively, modification of the length of the second antenna 16 is selected. For this, it is sufficient to take into account the characteristics of the structure of the antenna array 10 to be varied in the sub-step for expressing the wave generated by the antenna array 10 on the basis of spherical nodes. The excitation vector will then comprise the characteristics of the structure of the antenna array 10 to be varied. The resolution of the equation at the determination sub-step will not only comprise the determination of the values of the impedances Z1, Z2 of the loads 20, 21 but also the determination of the characteristics of the structure of the antenna array 10 which one wishes to vary.

In every case, an antenna array 10 is obtained having improved properties. According to the embodiments, the antenna array 10 is fixed, neither the structure nor the values of the impedances Z1, Z2 of the loads 20, 21 being adjustable. For example, in the case of a use of the antenna array 10 for pointing to the object (a remote control for example) with which the user communicates, the good directivity property will be favored to the detriment of other properties. In other embodiments, depending on the uses, either one of the properties of the antenna array (passing from a directive configuration to a non-directive configuration) should be promoted. In this case, it is particularly advantageous if the loads 20, 21 are adjustable. Typically, the loads 20, 21 are potentiometers associated with a component with variable inductance or variable capacitance. This allows further increase in the adaptability of the antenna array 10 according to the invention.

What is claimed is:

1. A method for generating an electromagnetic wave, the method comprising:

providing an antenna array for generating the electromagnetic wave, the antenna array comprising at least one antenna and at least one circuit, wherein the circuit is connected to at least one antenna of the antenna array and comprises parameters that affect the electromagnetic wave generated by the antenna array;

selecting a criterion to be met by the electromagnetic wave generated by the antenna array;

selecting required decomposition coefficients of the electromagnetic wave to enable attainment of the selected criterion;

generating the electromagnetic wave;

determining attained decomposition coefficients of the generated electromagnetic wave;

calculating the parameters that affect the electromagnetic wave generated by the antenna array for each circuit of the antenna array;

calculating the difference between the required decomposition coefficients and the attained decomposition coefficients of the electromagnetic wave generated by the antenna array; and adjusting the parameters that affect the electromagnetic wave such that the difference between the required decomposition coefficients and the attained decomposition coefficients is minimized.

2. The method according to claim 1, wherein the circuit is a coupling circuit.

3. The method according to claim 1, wherein the circuit is at least one load.

4. The method according to claim 1, wherein the calculating step further comprises:

calculating an excitation vector of the antenna array from desired the required decomposition coefficients; and determining the parameters that affect the electromagnetic wave generated by the antenna array of each circuit of the antenna array from the calculated excitation vector.

5. The method according to claim 1, wherein the decomposition and calculating steps are carried out by a matrix calculation.

6. The method according to claim 1, wherein the basis is the basis of spherical modes.

7. The method according to claim 1, wherein the criterion is selected from the group consisting of the directivity of the antenna array in a given direction, the ratio of the front to back return of the antenna array, the radiation diagram of the array, wherein the radiation diagram is substantially identical to a radiation diagram obtained with a specific mask, and the radiation diagram of the array in a perturbed environment is identical to a pre-determined radiation diagram.

8. The method according to claim 1, wherein the circuit is a coupling circuit based on a waveguide wherein the parameters that affect the electromagnetic wave generated by the antenna array.

9. The method according to claim 8, wherein the parameters are the impedance of the waveguide, the length of the guide, and the impedance of an associated load with the coupling circuit.

10. The method according to claim 1, wherein the circuit is at least one load, and wherein the parameters that affect the electromagnetic wave generated by the antenna array.

11. The method according to claim 10, wherein the parameter is the value of the impedance of each load.

12. The method according to claim 10, wherein at least one load comprises two separate components, a first component being a resistor and a second component selected from the group consisting of an inductor and a capacitor.

13. The method according to claim 10, wherein at least one load has a negative resistance.

14. The method according to claim 12, wherein at least one load has a negative resistance.

* * * * *